United States Patent [19]

Egendorf

[11] Patent Number: 4,553,252
[45] Date of Patent: Nov. 12, 1985

[54] COUNTING COMPUTER SOFTWARE CARTRIDGE

[76] Inventor: Harris H. Egendorf, 8016 Bustleton Ave., Philadelphia, Pa. 19152

[21] Appl. No.: 446,847

[22] Filed: Dec. 6, 1982

Related U.S. Application Data

[63] Continuation-in-part of Ser. No. 332,783, Dec. 21, 1981, Pat. No. 4,475,222.

[51] Int. Cl.⁴ ............... G11B 23/04; G06M 1/08
[52] U.S. Cl. ............................. 377/15; 364/300
[58] Field of Search ............. 377/15; 360/137, 132; 364/300

[56] References Cited

U.S. PATENT DOCUMENTS

| | | | |
|---|---|---|---|
| 3,604,624 | 9/1971 | Miura et al. | 360/137 |
| 3,678,215 | 7/1972 | Kihara | 360/132 |
| 3,761,643 | 9/1973 | Keeler, II | 179/100 |
| 4,095,791 | 6/1978 | Smith et al. | 273/85 |
| 4,119,813 | 10/1978 | Sato | 360/137 |
| 4,150,283 | 4/1979 | Fleischer | 377/15 |
| 4,259,668 | 3/1981 | Nishimura et al. | 340/711 |
| 4,283,056 | 8/1981 | Miller | 273/176 |

*Primary Examiner*—John S. Heyman
*Attorney, Agent, or Firm*—Seidel, Gonda, Goldhammer & Abbott

[57] ABSTRACT

A cartridge housing contains a semi-conductor or memory for storing digital information which may be accessed by an external device for display on a screen. The cartridge includes a counting circuit for counting the number of times the cartridge is used and a display for exhibiting the count.

7 Claims, 2 Drawing Figures

COUNTING COMPUTER SOFTWARE CARTRIDGE

RELATED CASE

This application is a Continuation In Part of my application Ser. No. 332,783 filed Dec. 21, 1981 and entitled Tape Cassette With Use Counter now U.S. Pat. No. 4,475,222 (issued Oct. 2, 1984).

BACKGROUND OF THE INVENTION

Rapidly expanding semi-conductor technology has enabled the storage of digital information in miniature semi-conductor chips. Such chips have been used to store computer programs of considerable size.

In the personal computer field, applications software has been stored in semi-conductor memory contained in a cartridge which is insertable in a receptacle of the computer housing.

Large scale integrated (LSI) techniques have made possible the storage of video information digitized from analog broadcast signals. The advent of very large scale integrated (VLSI) circuit techniques has produced semiconductor memories having extremely large storage capacities such as 256K.

In the video tape recorder (VTR) field, video information is stored on tape and reproduced on a television screen by means of the play-back circuitry in the VTR. Heretofore, video information for movies or the like has not been recorded in semi-conductor memory and made available in a plug-in cartridge for use with a VTR.

As far as I am aware, the only use of semi-conductor memory in storing video information as part of a plug-in cartridge has occurred in the computer game field. In the computer game field, video information is stored in semiconductor memories such as PROM. The information is accessed by the computer game control to provide a video game dispay in response to certain user commands. Software cartridges and video game cartridges in use today contain no device for monitoring frequency of actual use. Such a device would facilitate rental of the cartridges.

The use of rented cartridges provided with semiconductor memory for storing digital information pertaining to movies, computer games of software in general should also be subject to the owner's control so that pirating of the information stored in the memory can be prevented or exposed. Thus, a technique is required for preventing unauthorized use of the cartridge memory.

SUMMARY OF THE INVENTION

The present invention is directed to a cartridge which includes a housing having therein a semi-conductor memory for storing digital information which may be accessed by an external device and displayed on a screen. A sensing means is provided for sensing connection and disconnection of the cartridge to an external device. A counting means is provided for maintaining a count of the number of times that the cartridge is connected and disconnected from the external device. A display means is provided for displaying the count on an external portion of the housing.

The preferred embodiment of the cartridge is preferably provided with means for detecting unauthorized use of the cartridge. If the cartridge has been subjected to unauthorized use by copying the contents of the memory, a means is provided within the housing for detecting such act and providing an indication of the same. The indication is preferably in the form of an exhibition of the word COPIED on the means for displaying the count.

It is an advantage of the present invention in that it provides a means for monitoring the frequency of use of a plug-in cartridge provided with semi-conductor memory for storing video information for movies or the like, computer game programs, or software in general.

Another advantage of the present invention is that it provides a technique for detecting unauthorized use of the cartridge.

Other advantages of the present invention will appear hereinafter.

For the purposes of illustrating the invention, there is shown in the drawings a form which is presently preferred; it being understood, however, that this invention is not limited to the precise arrangements and instrumentalities shown.

DETAILED DESCRIPTION

Figure 1:
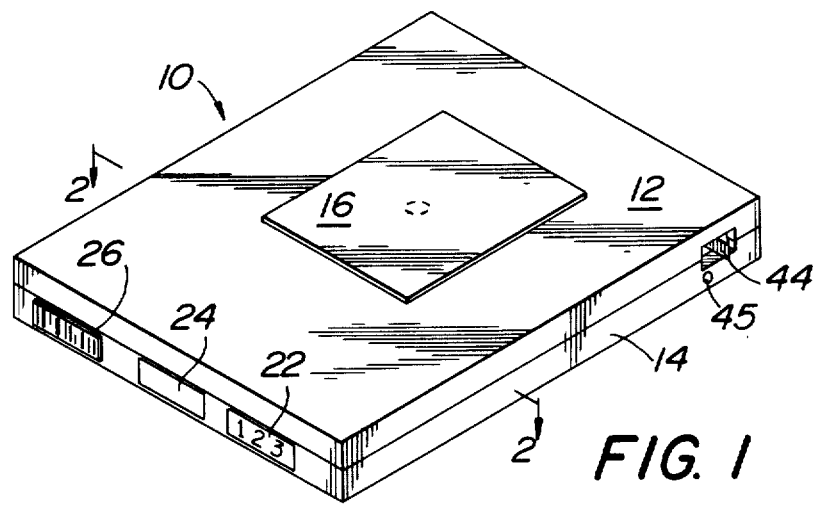
FIG. 1 is a perspective view of a cartridge in accordance with the present invention.

Referring to the drawings in detail, wherein like numerals indicate like elements, there is shown in FIG. 1 a perspective view of a cartridge 10 in accordance with the present invention. The cartridge 10 includes a housing of plastic or the like having a cover 12 connected by mating structure to a base 14. The cover 12 and base 14 may be coupled together in any one of a wide variety of manners. The cover is preferably coupled to the base 14 by a screw 18. The head of screw 18 is recessed in the cover 12 and concealed by a label 16 of the tear-away type. Screw 18 threads into a boss 20 on the inner surface of the base 14. Any attempt to remove the label 16 to obtain access to the screw 18 will be readily apparent.

At one end, the cartridge 10 includes a visible liquid crystal display (LCD) 22, a solar cell 24, and a bar label 26. The bar label is marked for inventory and accounting so that it may be read by a device such as a laser pen.

Figure 2:
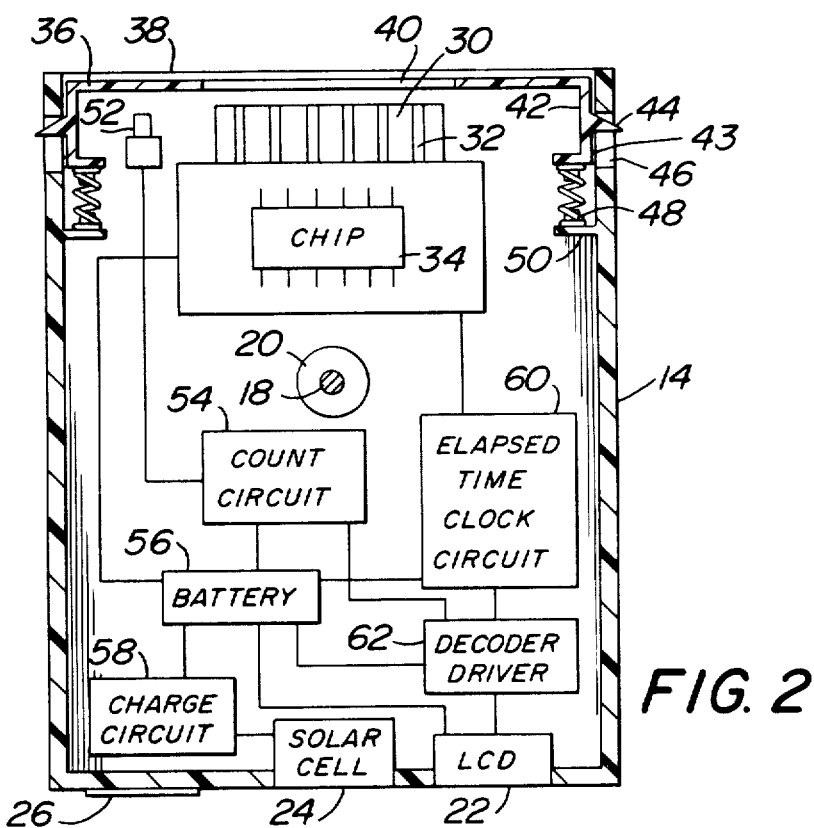
FIG. 2 is a longitudinal sectional view of the cartridge.

At the other end of the housing, the cartridge is provided with connecting means to facilitate connection and disconnection to an external device. The connecting means may assume a wide variety of configurations. The conecting means should be of the type which facilitates access to a printed circuit board within the cartridge only when the cartridge has been inserted into a mating connection device (not shown) such as the cartridge receptacle of a video game computer or personal computer. Such a receptacle could also be used in a VPU (Video Playback Unit) which can receive video information stored in a memory chip. In the structure illustrated in FIG. 2, there is provided within the cartridge housing a printed circuit board having leads 32 on a tab 30. The printed circuit board includes a semiconductor memory chip 34 containing video information and may contain audio information such as a sound track. The sound track may be stereo and decoded into two or more stereo channels by a system associated with the VPU.

The means to facilitate coupling of tab 30 to mating structure in a video game computer, personal computer or VPU includes a slidable wall 36 within the housing. A rib 38 on the base 14 prevents the wall 36 from being removed and acts as a limit stop for one position of the wall 36. Wall 36 has a slot 40 through which the tab 30 may extend when the wall 36 is moved inwardly due to contact with mating structure on the game computer, personal computer or VPU.

To insure that the wall 36 is movable inwardly only by contact with the mating structure, it is provided with flexible flanges 42 at its ends. Flanges 42 may be latched in a variety of different ways. As shown, each flange has a latch 44 extending through hole 46 in a side wall of the base 14. The latches are moved inwardly so that flanges 42 flex inwardly and withdraw pin 43 from hole 45 to thereby facilitate sliding of the wall 36 by the mating structure. A spring 48 extends between a bracket 50 on the base 14 and each flange 42 for biasing the wall 36 to the position shown in FIG. 2.

Counting by a count circuit 54 may be triggered electronically or by an electro-mechanical counting switch 52 which is provided in a position so as to be contacted when the wall 36 has been moved sufficiently inwardly so that tab 30 extends through the slot 40. Switch 52 is connected to a count circuit 54. When the switch 52 is contacted, it increments the count circuit 54. A battery 56 is connected to the solar cell 24 by way of a charge circuit 58. Battery 56 is connected to the chip 35 (in cases of reprogrammable chips) and the count circuit 54. Battery 56 is connected to the liquid crystal display 22. An elapsed time clock circuit 60 is connected to the battery 56 and the chip 34 so as to detect the time elapsed in accessing the memory. Each of the circuits 54 and 60 is connected to the liquid crystal display 22 through a decoder driver 62 which is powered by the battery 56.

The chip 34 is a semi-conductor memory chip which is per se known. For use with a VTR, the memory chip should have an extremely large storage capacity such as 256K or more so that it may contain all of the information with respect to a full-length movie or the like. The circuits 54, 58 and 60 as well as the decoder driver 62 are per se known.

One application of the cartridge 10 in the video rental field is as follows. Chip 34 is programmed to contain information such as a full-length movie or the like. Label 16 identifies the movie. Bar label 26 may also identify the movie and other inventory information. The number of uses of the cartridge is exhibited on the display 22 as shown in FIG. 1. When the cartridge is rented, the information on display 22 is noted on the rental agreement. When the cartridge is returned by the customer, the customer pays a rental fee based on the number of uses. Thus, display 22 will exhibit a number larger than the number identified in the rental agreement. Such fee assumes that the label 16 is still intact and display 22 exhibits a number.

When the customer inserts the cartridges 10 into a VPU having suitable mating structure to receive the cartridge, latches 44 move inwardly and pin 43 is withdrawn from hole 45, wall 36 is pushed inwardly thereby compressing springs 48, and tab 30 is accessible through the slot 40. Switch 52 is tripped to increment the count circuit 54 which in turn increases the count by one digit on the display 22. If desired, switch 52 may increment circuit 54 when wall 36 loses contact with switch 52 during withdrawal of the cartridge from the VPU.

The first pulse from the chip 34 triggers the clock circuit 60. Circuit 60 is a resettable counting circuit including a clock oscillator and digital counter. The counter is clocked by the clock oscillator. Once triggered, the counter counts to a predetermined threshold such as three seconds and then resets itself so long as the pulses are still being transmitted from the chip 34. If the transmission of pulses from the chip 34 have ceased within the time period set by circuit 60, this would be indicative of the fact that the contents of memory chip 34 have been retrieved at a high rate or speed indicative of copying of the memory contents. In that event, circuit 60 through driver 62 causes the display 22 to exhibit inidicia such as the word COPIED. When the cartridge is returned, the rental agent may readily ascertain that the memory of chip 34 has been copied.

All circuit components are preferably semi-conductor chip components. The power supply for the battery 56 includes a solar cell 24 which is mounted at one end of the housing so that it may continuously receive light. The solar cell 24 recharges the battery 56 through the circuit 58.

Thus, it will be seen that the cartridge of the present invention provides a means for monitoring the frequency of use of a plug-in cartridge having semi-conductor memory for storing information such as video information for movies or the like. Further, the cartridge includes means for immediately detecting unauthorized use of the cartridge such as piracy of the program stored in memory chip 34.

The present invention may be embodied in other specific forms without departing from the spirit or essential attributes thereof and, accordingly, reference should be made to the appended claims, rather than to the scope of the invention.

I claim:

1. In a cartridge adapted for insertion and use in a computer, the cartridge including electronic memory containing a stored program for use with the computer, the combination comprising a housing, a printed circuit board disposed within the housing and having a conductor portion electrically connectable to the computer, sensing means for sensing insertion of the cartridge into the computer and for generating an electrical signal, counting means electrically coupled to the sensing means for maintaining an electronic count of the number of times that the cartridge is inserted in the computer and display means electrically coupled to said counting means and located on the housing for displaying the count maintained by said counting means.

2. A cartridge in accordance with claim 1 wherein said display means is a liquid crystal display located at one end of the housing, and a bar label at said one end of the housing adjacent said display.

3. A cartridge in accordance with claim 1 wherein said housing is comprised of mating halves coupled together, and a tear-away label associated with the mating halves for indicating unauthorized separation of the mating halves.

4. A cartridge in accordance with claim 1 including a liquid crystal display mounted on the housing, said display being electrically coupled to said counting means for exhibiting the count.

5. In a cartridge adapted for insertion and use in a computer, the cartridge including electronic memory containing a stored program for use with the computer, the combination comprising a housing, a printed circuit board disposed within the housing and having a conductor portion electrically connectable to the computer, sensing means for sensing insertion of the cartridge into the computer and for generating an electrical signal, counting means electrically coupled to the sensing means for maintaining an electronic count of the number of times that the cartridge is inserted in the computer, a liquid crystal display electrically coupled to said counting means and located at one end of the housing for displaying the count, a bar label at said one end of the housing adjacent said display, said housing being comprised of mating halves coupled together, a tear-away label associated with the mating halves for indicating unauthorized separation of the mating halves.

6. A cartridge comprising a housing insertable in an external device, comprising:

a wall mounted on the housing and provided with an opening, said wall being displaceable between two positions, a printed circuit board having a conductor portion in juxtaposition with the wall opening such that the conductor portion protrudes through the opening when the wall is in one of said positions and is disposed behind the opening when the wall is in the other of said positions, signal generating means for generating an electrical signal based on displacement of the wall between said positions, means electrically coupled to said signal generating means for electronically maintaining a count based on the number of times that said wall is displaced between said positions, and display means mounted on the housing and electrically coupled to said counting means for displaying the count.

7. In a cartridge adapted for insertion and use in a computer, the cartridge including electronic memory containing a stored program for use with the computer, the combination comprising a housing, sensing means for sensing insertion of the cartridge in the computer and for generating an electrical signal indicating the same, counting means electrically coupled to the sensing means so as to receive said electrical signal and for maintaining an electronic count of the number of insertions of the cartridge in the computer, and display means electrically coupled to said counting means and located on the housing for displaying the count maintained by said counting means.

* * * * *